United States Patent [19]

Williams et al.

[11] Patent Number: 5,101,767

[45] Date of Patent: Apr. 7, 1992

[54] SEPARATOR COUNTER

[76] Inventors: Owen C. Williams, 4 Libra Close, Lilydale, Victoria, 3140; David G. Crowley, Lot 18, Uplands Road, Yarra Glen, Victoria, 3775, both of Australia

[21] Appl. No.: 614,173

[22] Filed: Nov. 15, 1990

[51] Int. Cl.[5] .............................................. A01K 29/00
[52] U.S. Cl. ..................................... 119/82; 198/442; 198/445
[58] Field of Search ............... 198/445, 442, 436, 437; 119/82, 15

[56] References Cited

U.S. PATENT DOCUMENTS

| | | | |
|---|---|---|---|
| 2,493,464 | 1/1950 | Nelson | 198/454 |
| 3,103,915 | 9/1963 | Crain et al. | 119/82 |
| 3,110,388 | 11/1963 | Elliott et al. | 198/359 X |
| 3,676,978 | 7/1972 | Gottweis et al. | 198/442 X |
| 3,805,743 | 4/1974 | Crowder | 119/82 |
| 3,805,744 | 4/1974 | Jochum | 119/82 |
| 4,043,443 | 8/1977 | O'Brien | 198/445 X |
| 4,051,964 | 10/1977 | Meijer | 198/442 X |
| 4,736,710 | 4/1988 | Nicolai | 119/82 |
| 4,901,841 | 2/1990 | Haggerty et al. | 198/445 X |

FOREIGN PATENT DOCUMENTS 0487641  11/1929  Fed. Rep. of Germany.

Primary Examiner—Joseph E. Valenza
Assistant Examiner—Cheryl L. Gastineau
Attorney, Agent, or Firm—Marion P. Lelong

[57] ABSTRACT

A live chicken separating and counting machine which has a single high level primary endless belt conveyor connected by a divergent fixed chute to twin lower level secondary conveyors of higher speed than the primary conveyor to further separate chickens; a pair of additional but mobile product flow-diverting or changeover chutes is provided at the discharge end of the secondary conveyors, these chutes oscillate intermittently in a limited horizontal arc in synchronization with a pair of L-shaped flaps each of which has a long arm and a short arm, both flaps pivot in a limited vertical arc below the discharge end of the mobile chutes both of which when aligned in an inner position, fill an inner collection chamber for chickens which is closed off by short arms of the flaps and when the mobile chutes are diverted to an outer position, long arms of the flaps swing up to a horizontal position, closing off the bottom of the outer collection chambers which then fill with chickens.

12 Claims, 3 Drawing Sheets

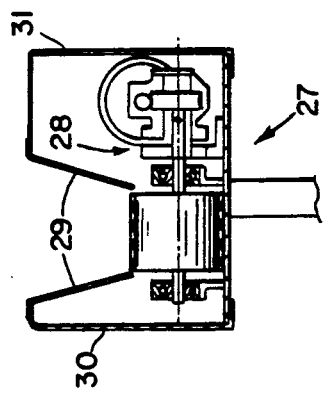
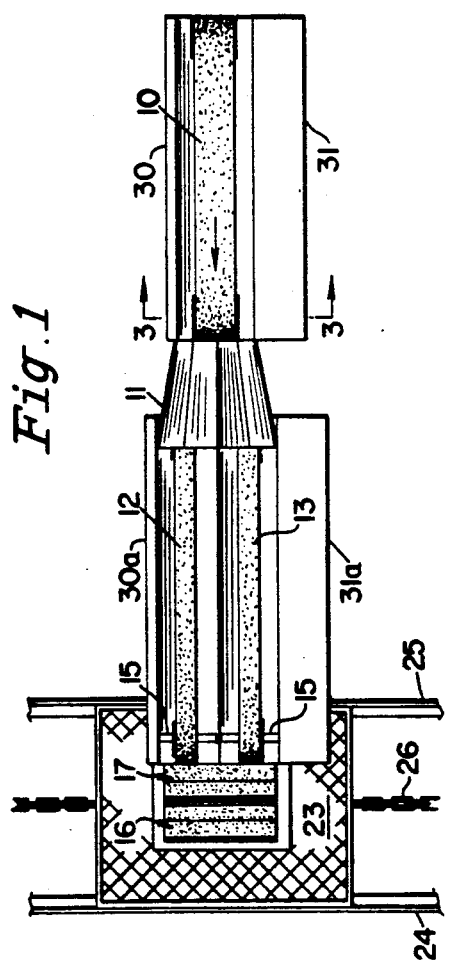
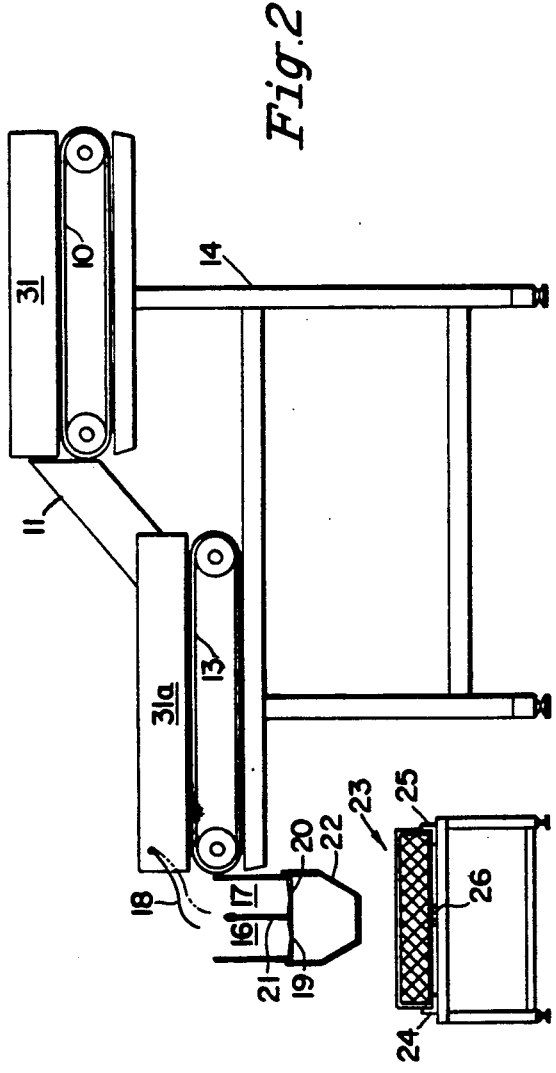

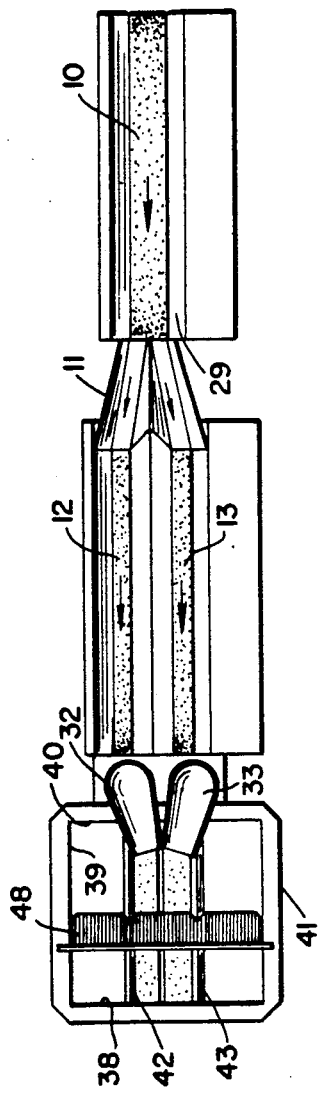
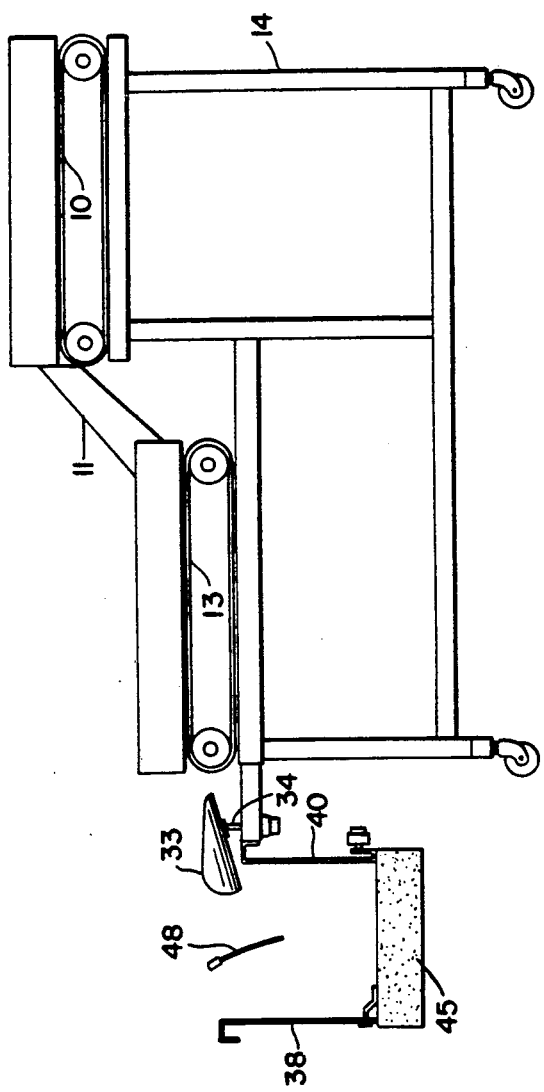
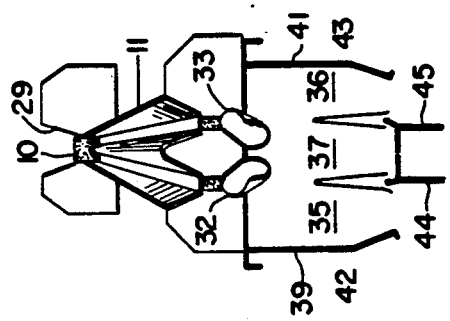

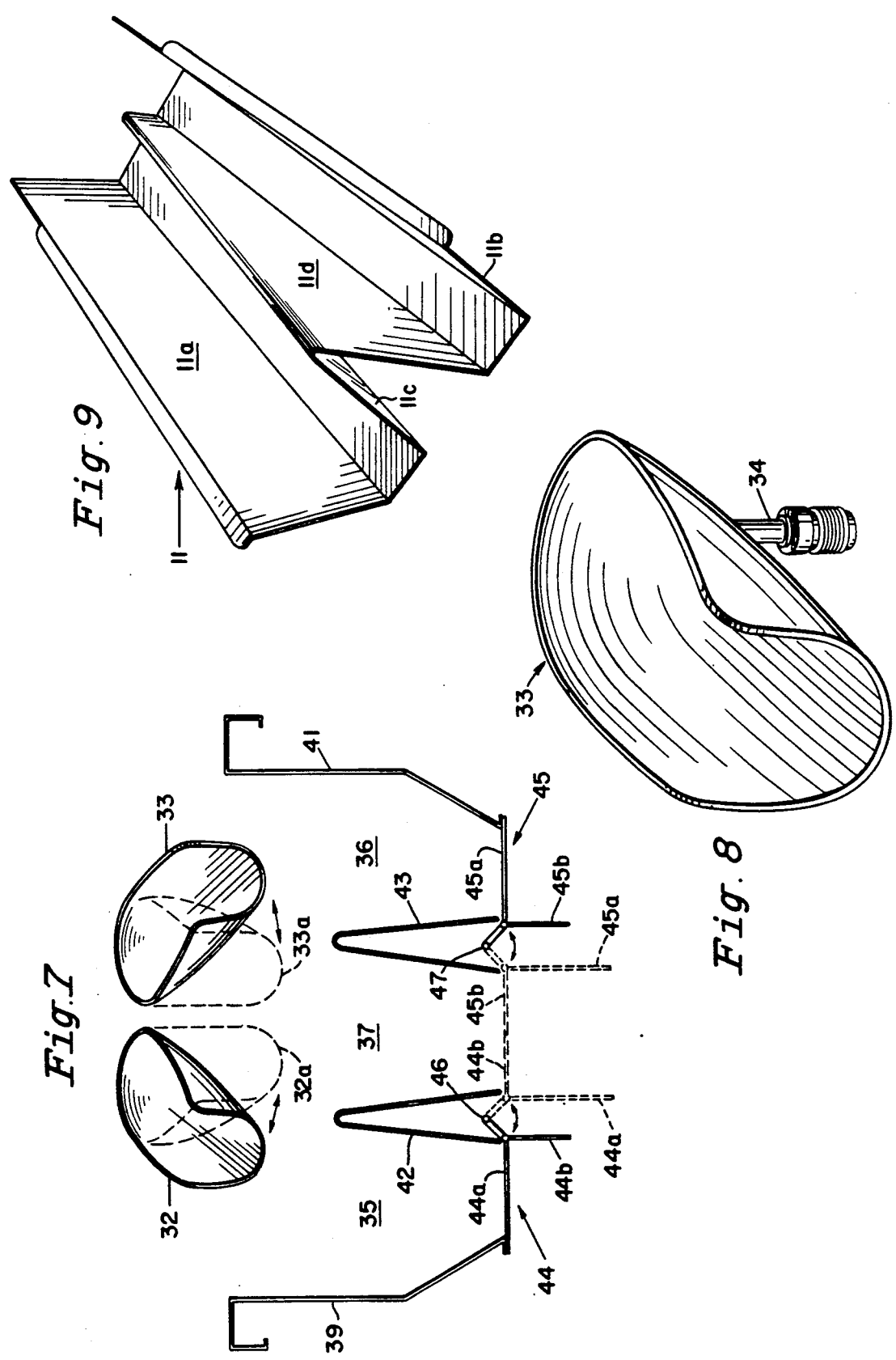

SEPARATOR COUNTER

This invention relates generally to apparatus for handling livestock and relates in particular to apparatus for separating and counting live chickens but the invention may have application to other articles or products.

BACKGROUND OF THE INVENTION

A problem associated with the counting of live chickens is to be able to separate them sufficiently to enable counting to be effected.

Another problem is that articles or products such as livestock, fruit and the like are susceptible to injury or damage when handled mechanically.

Apparatus for counting both animate and inanimate articles is generally known and one example for counting bottle tops is disclosed in U.S. Pat. No. 2,493,464 of Nelson assigned to Production Instrument Company which is mainly concerned with control apparatus and a switch in particular. In this patent there is a conveyor belt and side walls forming a channel for confining the articles and at the discharge end the products follow a convergent rather than a divergent path by means of a horizontally rotating drive wheel of adjustable speed and rim spacing for varying the width of a restricted passageway in the channel forming a gate in conjunction with a resilient control switch actuating spring plate depressed by the passage of each bottle cap passing over it to contact an adjustable contact switch actuating pin to thereby record an electrical impulse at a counter. Bottle caps discharged from the restricted passage are diverted alternatively into two fixed branch chutes feeding directly into containers. U.S. Pat. No. 3,110,388 of Elliott, Weaver and Scholl discloses an automatic device for catching live poultry and conveying same to a counter while using different belt speeds to separate fowl which are dropped through a hopper onto counting means in the form of an upper first pair of downwardly inclined, retractable, fall-checking flaps and then onto a lower pair of fall-retarding flaps which alternately deflect counted fowl onto one of a pair of contra-rotating drums with fingers to deflect fowl towards one of a pair of fixed outwardly and downwardly-inclined, discharge chutes. The flaps do not form collection chambers. German patent No. 487,641 discloses a pair of outwardly curved, fixed diversion chutes below the discharge end of a primary conveyor and a movable gate swings between the conveyors to divert articles to either a left-hand or a right-hand conveyor arranged at right angles to and below the primary conveyor.

SUMMARY OF THE INVENTION

A main object of this invention is to provide apparatus for separating live chickens for counting.

Another object is to provide apparatus which will divert chickens from a main or primary conveyor to a faster moving secondary conveyors and then further divert live chickens after counting into holding collection chambers before release into bins.

In accordance with these objects and the principles of this invention, there is provided apparatus for separating articles and products for counting comprising a primary, endless flexible belt conveyor for loading of products or articles namely live chickens the discharge end discharges the chickens by gravity through a fixed, downwardly inclined divergent chute onto a pair of identical, parallel, secondary endless belt conveyors at a lower level and moving at a higher speed then the primary conveyor for separating the chickens for counting, the secondary conveyors discharge into a pair of mobile, changeover diversion chutes oscillating horizontally and intermittenly in a limited horizontal arc in synchronization with trapdoor flaps which oscillate intermittently in a limited vertical arc to form the floor of collection and holding chambers.

The novel arrangement of features which are considered to characterize the invention are set forth in particular in the appended claims.

Other features, uses and advantages of the invention will become apparent from a reading of the following description of the embodiment thereof presented in the accompanying drawings.

BRIEF DESCRIPTION OF THE DRAWINGS

Several non-limititative example of practical arrangements of the separator counter apparatus for live chickens according to the invention will be described in greater detail by reference to the accompanying drawings in which like reference numerals denote like parts and in which:

FIG. 1 is a plan view of one embodiment of the live chicken separating and counting apparatus according to the invention.

FIG. 2 is a side elevation of the apparatus of FIG. 1 omitting belt drive assemblies.

FIG. 3 is an enlarged section taken along the line 3—3 of FIG. 1 and in the direction of the arrows showing a standard belt drive assembly.

FIG. 4 is a plan view of another embodiment of the invention.

FIG. 5 is a side elevation of the apparatus of FIG. 4.

FIG. 6 is an end elevation of the embodiment of FIGS. 4 and 5.

FIG. 7 is a schematic front view of the apparatus of FIGS. 4 to 6 on an enlarged scale.

FIG. 8 is a perspective view on an enlarged scale of a mobile diversion unit of FIGS. 4 to 7 on an enlarged scale.

FIG. 9 is a perspective view of the fixed diversion chute encircled in FIG. 4.

DESCRIPTION OF THE DETAILED EMBODIMENT

Referring to the drawings and first of all to the basic embodiment of FIGS. 1, 2 and 9 there is shown apparatus for separating products and articles and preferably for counting live chickens and which comprises a chicken-separating conveyor system comprising a primary upper endless belt conveyor 10, the discharge end of which is connected to a products or articles fixed divergent means in the form of a gravity feed, fixed and stationary chute 11 which is downwardly inclined to the horizontal and which has side walls 11a and 11b which are both outwardly inclined with respect to the floor of the chute 11 and which are flared or outwardly directed with respect to the flow path of the articles or products, so that the discharge or downstream end is much wider than the feed or upstream end. The fixed chute 11 has median walls 11c and 11d which are outwardly inclined and rearwardly tapered and the chute feeds two secondary conveyors 12 and 13 which are arranged mutually in parallel and at a lower level than the primary conveyor 10. The conveyor system is supported by the stand 14. Above the discharge end of the two lower conveyors 12, and 13, there is installed a plurality of electonic sensors, such as the modulated infra-red sensors designated 15 and below the discharge end thereof, a pair of chicken collection and holding bins 16, 17 are stationed and between the secondary conveyors discharge end and above the chicken holding bins there is mounted a mobile chute changeover mechanism 18 which oscillates intermittenly and horizontally about the longitudinal axis of the conveyors to deflect chickens into either bin, when each bin is filled with a predetermined number of counted chickens such as for example fifty chickens. At the bottom of the bins there are rubber flaps 19 and 20, for arresting the fall of chickens and the bins are formed by a lateral dividing wall 21, the top edge of which is rubber tipped. Chickens are dropped through the flaps via a chute 22 into a standard chicken box 23 of a box feed conveying system and the box, which is supported for movement in a lateral direction with respect to the conveyors by means of guide rails 24 and 25 and also the chicken box 23 are driven by a chain conveyor 26.

A suitable drive mechanism arrangement for the conveyors is shown in FIG. 3 and comprises a belt drive assembly 27, comprising a standard motor and gearbox 28, housed within chicken retainer trough 29 and outer guard covers 30, 31. The secondary conveyors 12, 13 are also within or at the bottom of deep troughs formed by side walls 30a, 31a the troughs being of sufficient depth to prevent loss of chickens from the conveyors.

Referring to the embodiments of FIGS. 4 to 8 of the drawings which show a modification to the apparatus of FIGS. 1 and 2 by addition thereto of additional product diversion means in the form of a mobile diversion mechanism wherein two mobile, intermittently oscillating, changeover diversion chutes 32, 33 formed as walled, tapered scoops with a closed wall at one wider or upstream end and an open wall at a narrower or downstream end (as seen more clearly in FIG. 8. Each mobile chute is mounted on a fixed pivotal shaft, such as the one designated 34 in FIG. 5 for limited and intermittent oscillation in a horizontal arc. The mobile chutes 32 and 33 operate in phase between a mutually outwardly diverted position facing towards two outer product-collection bins or chambers 35 and 36 (as shown in FIGS. 6 and 7 and a mutually, inwardly directed position 32a and 33a (in broken outline as shown in FIG. 7 respectively to divert products or articles—in this example live chickens—leaving the two lower conveyors towards an inner or central product collection chamber 37 and the two outer collection chambers 35 and 36 on either side of the central collection chamber 37—these three chambers are formed between four outer walls 38, 39, 40, and 41 of the bin and the inner dividing walls 42 and 43. Each mobile diversion chute 32 and 33 respectively, oscillates in association with a pair of flaps 44 and 45 which are positioned below the mobile diversion chutes. Referring to FIG. 7, each flap 44 and 45 oscillates intermittently in a limited vertical arc about a fixed pivot on a crank-arm shaft 46 and 47 and has a long arm 44a and 45a and a short arm 44b and 45b for opening and closing the bottom of the product collection chambers, shown in broken outlines in the central position with short arms closing the bottom of the central chamber. The flaps are each pivotted at the junction of the long and short arms thereof below two chamber-forming dividing walls 42 and 43 forming an inner or central and outer chambers. The long arms of the flaps are adapted to close off the bottom of the outer chambers and the short arms of the flaps are adapted to close off the bottom of the inner or central product collection chamber. The movements of the mobile chutes and the flaps are synchronized so that when the chutes are parallel and in longitudinal alignment with the axis of the conveyors to face the central product-collection chamber, the short arms of the flaps are swung up into a horizontal position closing the central chamber and when the chutes are swung outwards, or diverged at an angle to the longitudinal axis of the two lower conveyors, products or articles—in this example live chickens—dropping off these conveyors are diverted to the two outer collection chambers and when the chutes are diverged, the long arms of the flaps simultaneously swing up and outwards to close off the bottom of each outer chamber. Chickens dropping from the collection bins are protected by the rubber finger curtain 48.

The materials of construction used in the present invention can be varied but comprise mild steel for the stand, stainless steel for the chutes and polyvinyl chloride or other synthetic polymeric materials for the conveyor belts, the pulleys are preferably constructed of NYLON.

Varations and modifications of the invention may be made within the scope of the claims and parts or portions of the chicken separator counter apparatus may be used without others and it will therefore be understood that the embodiment described above is in no way restrictive and may give rise to any desirable modification without departing from the scope of the invention.

We claim:

1. Apparatus for separating products or articles for counting, comprising a products or articles loading, primary, endless belt conveyor with a discharge and thereof adapted to discharge the loaded products or articles through diversion means enabling the products or articles to move in a divergent path to separate the products or articles for counting and for delivering the separated products or articles onto a pair of identical, parallel, secondary endless belt conveyors for further separating and/or, counting the products or articles, the primary conveyor being a single conveyor at a higher level and at a slower speed than the secondary conveyors, the diversion means comprising both fixed and mobile means, the fixed diversion means being a fixed partitioned chute inclined to the horizontal and having a discharge end discharging products or articles by gravity onto a pair of secondary conveyors below the discharge end of the fixed chute which has outwardly directed outer walls and inwardly inclined and rearwardly tapered inner walls, a plurality of sensors being installed above the discharge end of the secondary conveyors, the mobile diversion means being a changeover mechanism comprising a pair of mobile, identical changeover diversion chutes mounted on a fixed pivot point above at least one collection bin, each mobile chute oscillating intermittently and laterally in a limited arc with respect to the secondary conveyors to deflect products or articles into at least one holding chamber when each bin is already filled with a predetermined number of products or articles, rubber flaps being provided at the bottom of each bin for arresting the fall of the said products or articles, product-collection chambers being formed by lateral dividing walls the top edge of which is rubber tipped.

2. Apparatus according to claim 1, wherein the products or articles are live chickens which are dropped through the rubber flaps via a fixed chute into a standard chicken box supported for movement in a lateral direction with respect to all the conveyors by means of guide rails, the box being driven by a chain conveyor.

3. Apparatus according to claim 2 wherein each mobile chute is in the form of a tapered scoop with a closed upstream end and open downstream end.

4. Apparatus according to claim 1 wherein the pair of mobile diversion chutes operate in phase between a mutually, inwardly directed position and a mutually, outwardly directed position to divert articles leaving delivery ends of secondary conveyors, either to a central products or articles collection chamber or to two outer products or articles collection chambers on either side of the central products or articles collection chamber.

5. Apparatus according to claim 4, wherein the pair of mobile diversions chutes oscillate in association with a pair of trapdoor flaps positioned below the chutes, each flap being adapted to intermittently oscillate in a limited vertical arc to open and close the bottom of a central products or articles collection chamber and alternatively the bottom of the two outer chambers.

6. Apparatus according to claim 5 wherein each flap is L-shaped with a long arm and a short arm and is pivotally mounted at the junction of the arms thereof below two dividing walls forming a products or articles central collection chamber and a products or articles outer collection chamber, the long arm of each flap being adapted to form the bottom of the outer collection chamber, the short arm being adapted to form half the bottom of the central collection chamber.

7. Apparatus according to claim 6, wherein movements of mobile diversion chutes are parallel and in longitudinal alignment with the axis of the conveyors to face the products or articles central collection chamber, the short arm of each flap swings up into a horizontal position and closes a gap at the bottom of the said central chamber and when the mobile chutes are mutually diverged, the long arm of each flap swings up into a horizontal position to close the gap at the bottom of each respective outer collection chamber.

8. Apparatus according to claim 1 wherein the pair of changeover mobile diversion chutes are each mounted on a fixed pivot point on a vertical shaft at an angle to the horizontal.

9. Apparatus according to claim 8, wherein each vertical shaft is mounted upon a direct drive air motor drive unit to produce intermittent limited angular oscillation of the mobile diversion chutes about their respective pivot points.

10. Apparatus according to claim 9 wherein the oscillation of the mobile diversion chutes is governed by a combination of external stop plates on each of a pair of vertical shafts and screws which are adjustably mounted within threaded plates.

11. Apparatus according to claim 9 wherein at least one air motor direct drive unit with a horizontal oscillating outlet flap is mounted below the products or articles mobile diversion chutes.

12. Apparatus according to claim 1 wherein each of the two lower belts travels at four times the speed of the upper belt to achieve longitudinal spacing of products or articles, while the fixed chute achieves lateral spacing.

* * * * *